US011882415B1

(12) United States Patent
Kanaris et al.

(10) Patent No.: US 11,882,415 B1
(45) Date of Patent: Jan. 23, 2024

(54) SYSTEM TO SELECT AUDIO FROM MULTIPLE CONNECTED DEVICES

(71) Applicant: AMAZON TECHNOLOGIES, INC., Seattle, WA (US)

(72) Inventors: Alexander Kanaris, San Jose, CA (US); Gurhan Saplakoglu, Acton, MA (US); Berkant Tacer, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 82 days.

(21) Appl. No.: 17/303,112

(22) Filed: May 20, 2021

(51) Int. Cl.
*H04R 3/00* (2006.01)
*H04R 5/04* (2006.01)

(52) U.S. Cl.
CPC ............... *H04R 3/005* (2013.01); *H04R 5/04* (2013.01); *H04R 2203/12* (2013.01); *H04R 2430/23* (2013.01)

(58) Field of Classification Search
CPC ...... H04R 3/005; H04R 5/04; H04R 2203/12; H04R 2430/23
See application file for complete search history.

(56) References Cited

U.S. PATENT DOCUMENTS 7,522,736 B2 4/2009 Adcock et al.
9,319,787 B1 4/2016 Chu
9,716,980 B1 * 7/2017 Thiagarajan .............. G01S 5/30
10,095,470 B2 * 10/2018 Lang ........................ G06F 3/165
2008/0077261 A1 * 3/2008 Baudino ........... H04M 1/72412 700/94
2014/0286497 A1 9/2014 Thyssen et al.
2015/0279356 A1 * 10/2015 Lee ......................... G10L 15/20 704/251
2017/0083285 A1 * 3/2017 Meyers ................... G10L 15/00
2017/0098457 A1 * 4/2017 Zad Issa ............... G10L 21/034

OTHER PUBLICATIONS

"Comparison of time difference-of-arrival and angle-of-arrival methods of signal geolocation", Report ITU-R SM.2211-2 (Jun. 2018), International Telecommunication Union, Radiocommunication Sector of ITU, 40 pages. Retrieved from the Internet: URL: https://www.itu.int/dms_pub/itu-r/opb/rep/R-REP-SM.2211-2-2018-PDF-E.pdf.

(Continued)

*Primary Examiner* — Daniel R Sellers
(74) *Attorney, Agent, or Firm* — Lindauer Law, PLLC

(57) ABSTRACT

A group of devices acquire audio input of a sound, such as speech, using respective microphones. For pairs of devices in the group, intensity of energy of audio input at each of the devices in the pair is used to determine first proximity data. Relative differences in time-of-arrival of the sound at the devices in the pair is used to determine second proximity data. The first and second proximity data are used to determine an estimated closest device of the pair with respect to the sound. Comparison of the first proximity data to the second proximity also allows a confidence value to be associated with the estimated closest device. The estimated closest device with the greatest confidence value may be selected for use to acquire audio input, present output, and so forth. Additional techniques such as beamforming techniques may be applied to the audio input from the selected device.

20 Claims, 6 Drawing Sheets

(56) References Cited

OTHER PUBLICATIONS

"Multilateration", Wikipedia, 8 pages. Retrieved from URL: https://en.wikipedia.org/wiki/Multilateration on May 4, 2021.
Jiang, et al., "Two-stage Localisation Scheme Using a Small-scale Linear Microphone Array for Indoor Environments", The Journal of Navigation (2015), vol. 68, pp. 915-936. The Royal Institute of Navigation 2015. Retrieved from the Internet: URL: https://www.cambridge.org/core/services/aop-cambridge-core/content/view/D79A0D0A270B4CBE3836695F6FB0E41F/S0373463315000107a.pdf/div-class-title-two-stage-localisation-scheme-using-a-small-scale-linear-microphone-array-for-indoor-environments-div.pdf.
Li, Steven, "TDOA Acoustic Localization", Jul. 5, 2011, pp. 1-3. Retrieved from the Internet: URL: https://s3-us-west-1.amazonaws.com/stevenjl-bucket/tdoa_localization.pdf.

* cited by examiner

500

| Pairwise Set Data 154 | Energy Ratio (first/second) 228 | First Proximity Data 262 | TDOA Value (relative to first of pair) 242 | Second Proximity Data 264 | Pairwise Closest Device Data 266 | Confidence Value 272 |
|---|---|---|---|---|---|---|
| 106(1)-106(2) | 2.1 | 106(1) | -9.0 ms | 106(1) | 106(1) | High |
| 106(2)-106(3) | 0.5 | 106(3) | +11.3 ms | 106(3) | 106(3) | High |
| 106(3)-106(1) | 0.8 | 106(1) | -2.2 ms | 106(3) | 106(3) | Low |

FIG. 5

SYSTEM TO SELECT AUDIO FROM MULTIPLE CONNECTED DEVICES

BACKGROUND

Many network-connected devices may have microphones to acquire audio input. These devices may be distributed throughout a physical space. The physical space may include various noise sources.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates data associated with FIG. 4, according to one implementation.

Figure 1:
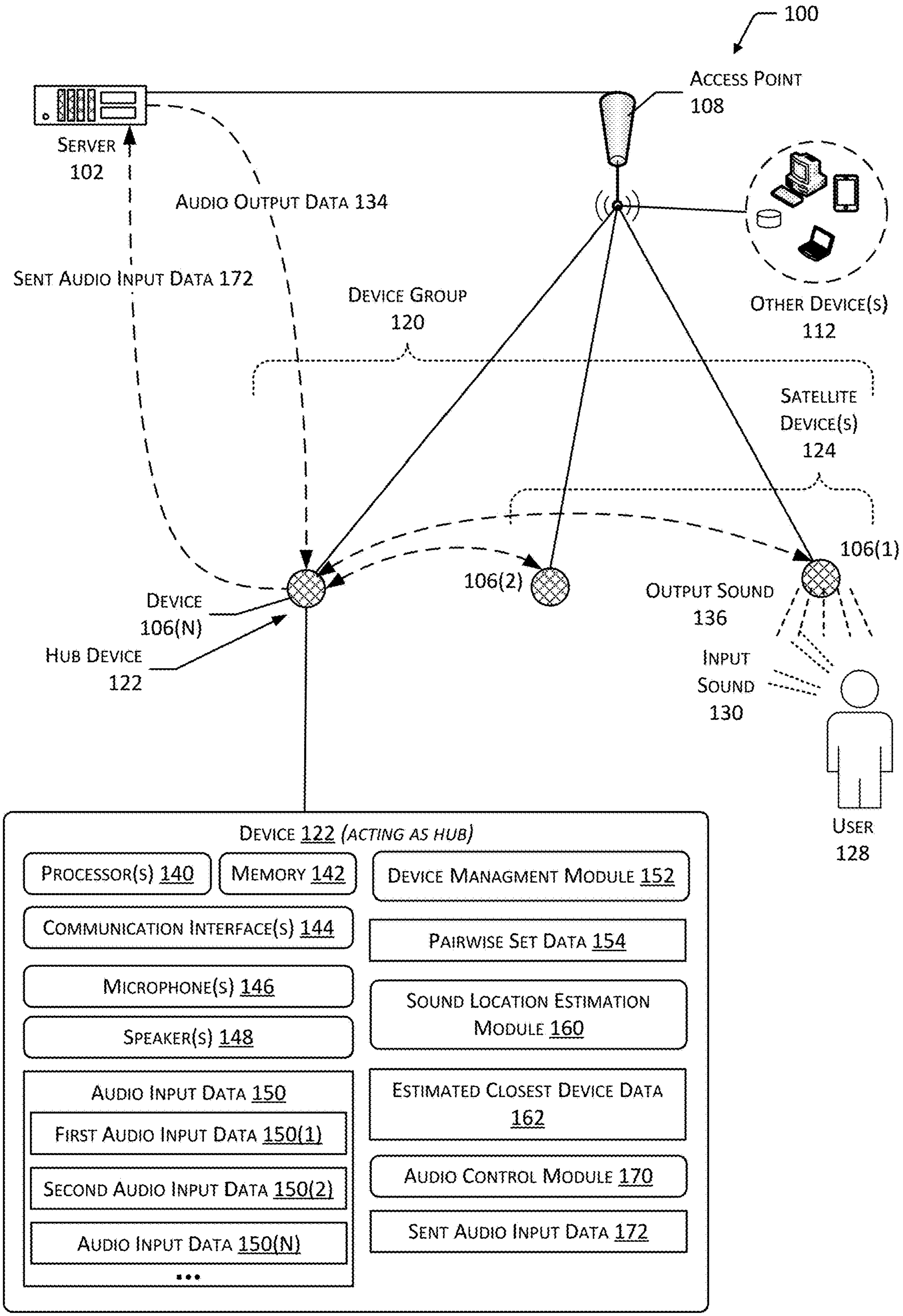
FIG. 1 illustrates a system comprising a plurality of devices in which audio input from pairs of devices is assessed to determine which device having a microphone is closest to a sound source, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Devices within a physical space, such as a home or office, may include input devices such as microphones and output devices such as speakers, displays, and so forth. The devices may be in communication with one another, forming a group of devices that may operate in conjunction with one another to provide various functionality to users. In one example, a user may participate in a telephone call using the devices. Audio input of the user talking may be acquired by microphones of the devices and sent to the other party on the call. Audio output, such as audio from the other party, may be presented using speakers of the devices.

As users move within the space, their location, orientation, or both relative to these devices may change. As a result, the audio input from a microphone (or array of microphones) from a particular device may change over time. For example, consider a situation in which a user moves away from a first device and towards a second device. If the audio input from the microphones of the first device continues to be used, the amplitude of the user's speech will decrease as distance increases. This reduces the signal to noise ratio (SNR) of the user's speech. The user's speech would need to be amplified to try and maintain a constant level of audio output. Even with such techniques, the other party on the call would hear the user's speech becoming noisier and quieter and may begin to have difficulty in understanding what the user is saying. Similarly, if the speaker of the first device is being used to provide audio output, as the user moves away, it becomes harder for the user to hear that audio. This results in a poor user experience.

Automated systems may be similarly affected. For example, a natural language processing (NLP) system that is being used to determine user input based on speech from the user will typically be more accurate as the noise in the input signal is reduced, SNR of the speech is above a threshold value, and so forth. Continuing the example, an NLP system will typically provide more accurate output if the user is close to and talking towards the microphone, rather than far away.

Described in this disclosure are techniques to determine which device, in a plurality of devices in a physical space, is closest to a source of a sound. The source of the sound may be a user talking. The techniques described are computationally efficient, allowing very low latency processing. This results in very low latency determinations as to which device is closest, allowing the system to acquire audio input and present output data that moves with the user as they move throughout the physical space. The system also operates in scenarios involving multiple users who are talking concurrently.

To determine the closest device to a source of a sound, comparisons are made of audio input from pairs of devices in the plurality of devices. Pairwise set data designates unique pairings of devices within the plurality of devices that are operating in conjunction with one another. For example, if three devices are in use, there would be three pairs.

For each pair comprising a first device and a second device, a determination is made as to which device is closest to the source of the sound. This determination is based on first proximity data and second proximity data.

The first proximity data is based on a comparison of energy present in first audio input from the first device and second audio input from the second device. In one implementation, the audio input having greater energy, sound pressure level (SPL), and so forth is deemed to be closest to the source.

The second proximity data is based on a time difference of arrival (TDOA) of the sound as represented in the first audio input and the second audio input. In one implementation, the device at which the sound arrives first may be deemed to be the closest to the source.

The closest device may be determined based on the first proximity data and the second proximity data. The first proximity data and the second proximity data may be compared. If they indicate the same device, a high confidence level may be associated with the determination. If the first proximity data and the second proximity data disagree, a low confidence level may be associated with the determination. In the event of a disagreement, the second proximity data may be used as the closest device.

In some implementations an estimated location of the source of sound, relative to the devices may be determined. Multilateration techniques may be used to determine an estimated location in the physical space based on one or more of the energy values, the TDOA values, and so forth. For example, the estimated location may indicate that the sound is 1.5 meters from the first device, 2.5 meters from the second device, and 1.9 meters from a third device. Given known relative locations of the three devices, the estimated location may be determined to be at the intersection of these distances.

The estimated location may be used to determine an estimated closest device. For example, a device that is a shortest distance in the physical space from the estimated location may be deemed the estimated closest device.

Once an estimated closest device is determined, this information may be used to control which audio input is used. For example, the audio input data generated by processing input from a microphone of the estimated closest device may be used for the outbound audio of the telephone call that is sent to the other party. In other implementations, audio input data from several devices may be selectively mixed based on the information about the estimated closest device.

The estimated closest device may also be used to control which device is used for audio output. Continuing the example, the estimated closest device that has a speaker may be used to present the audio output of the telephone call, presenting the audio from the other party.

In other implementations, the estimated closest device data may be used to provide other functionality. For example, as the user moves through their home speaking, visual output may be presented on a closest display device. In another example, if a user summons a robot, the robot may be ordered to move to the estimated location of the source of the sound that summoned the robot.

By using the techniques described in this disclosure, the system is able to quickly and efficiently determine an estimated location of the user and adjust operation of the system accordingly. This allows rapid selection of devices for input and output that is seamless to the user while remaining computationally efficient.

FIG. 1 illustrates a system 100 comprising a plurality of devices in which audio input from pairs of devices is assessed to determine which device having a microphone is closest to a sound source, according to one implementation.

A server 102 is in communication with a device group 120 comprising a plurality of devices 106(1), 106(2), . . . , 106(N). The server 102 may be accessed via a wide area network, such as the Internet. The server 102 may provide various functions such as natural language processing, telecommunications, content distribution, and so forth.

The devices 106 in the device group 120 are in communication with one another. In one implementation, the devices 106 may connect to one or more access points 108 to form a wireless local area network (WLAN). For example, devices 106(1)-(N) are connected to the access point 108 in this illustration.

The devices 106 may use the WLAN to communicate with one another, or with other resources such as the server 102. The devices 106 may communicate with one another or the access points 108 using a protocol such as WiFi, Bluetooth, and so forth. Other devices 112 may also connect to the one or more access points 108. For example, a laptop computer, tablet computer, and so forth may connect to the access point 108.

In some implementations the system 100 may include a wired local area network (LAN), such as an Ethernet network. For example, some of the devices 106 may be connected via a wired Ethernet connection to the LAN, and the LAN may in turn be connected to the access point 108.

The devices 106 may facilitate performance of various functions. For example, the devices 106 may include network enabled speakers, appliances, home entertainment systems, televisions, and so forth. In some implementations, the devices 106 may include input devices such as microphones 146 to acquire audio input data 150, output devices such as speakers 148 to present audio output data 134 as output sound 136, displays to present visual output, and so forth.

The devices 106 in the device group 120 are located at different locations within a physical space, such as a home, office, and so forth. During operation of the system 100, a user 128 may produce an input sound 130. For example, the user 128 may talk aloud, utter a non-lexical vocable, clap, snap their fingers, tap their shoe upon the ground, knock on a tabletop, and so forth, producing the input sound 130.

The device group 120 comprises two or more devices 106. As the user 128 moves within the physical space, one or more of the orientation or location of the user 128 changes with respect to the devices 106. For example, as the user 128 walks from one end of a room to another, they may move away from device 106(2) and towards device 106(1).

Sound in the atmosphere results from a movement of the surrounding air. A source of a sound uses energy to provide mechanical motion in the air. For example, the user 128 speaking converts metabolic energy into mechanical energy, or a speaker converts electrical energy into mechanical energy. This mechanical motion results in slight compressions (increases in air pressure) and rarefactions (decreases in air pressure). These changes in pressure are what cause movement of an eardrum used in human hearing. In another example, these pressure changes cause movement of a microphone diaphragm, allowing sound to be detected electronically.

The energy present in an acoustic or sound signal may be characterized using one or more metrics. One metric is sound pressure level (SPL), that is a logarithmic measure of effective pressure of a sound relative to a reference value. While this varies with frequency, generally speaking, the greater the SPL, the "louder" a sound may be perceived by a human ear.

As distance between a source of the input sound 130 and a detector increases, the energy decreases according to the inverse relationship. The detector may be an ear or a microphone. For example, the SPL at 2 meters may be one-half the SPL at 1 meter. This is readily observed in everyday experience as it is more difficult to hear someone at the opposite end of a large room than someone who is standing nearby.

The input sound 130 as emitted may also be directional. For example, sound from the user 128 talking is louder in front of the user 128 than behind them. As the frequency of the input sound 130 increases, this directionality becomes more significant. For example, a low frequency sound of 150 Hz may be relatively omnidirectional, while a high frequency sound of 3000 Hz may be directed predominately towards a front of a user 128.

Sound waves take some time to move, or propagate, through the surrounding air. For example, the input sound

130 emitted by the user 128 in FIG. 1 will arrive and be detected first at the first device 106(1), second by the second device 106(2), and then some time later by the third device 106(N). If the devices 106 are physically separate from one another, the input sound 130 arrives at their respective microphones at different times due to the propagation time. At standard temperature, pressure, and composition, sound travels approximately 343 meters per second (m/s). Stated in terms of time, a sound takes about 2.9 milliseconds (ms) to travel 1 meter. For example, if the first device 106(1) and the second device 106(2) are about 10 meters apart, the input sound 130 will reach the first device 106(1) 29 ms before reaching the second device 106(2).

In the implementation depicted here, during operation of the system 100, one device 106 from the device group 120 may be designated as a hub device 122. The hub device 122 may perform at least a portion of the operations described herein. The hub device 122 may operate in conjunction with one or more satellite devices 124. The designation of a device 106 as a hub device 122 may change. For example, at a first time the first device 106(1) may be the hub device 122, while at a second time the other device 106(N) may be the hub device 122. The hub device 122 may be determined based on available compute resources, data transmission latency with respect to the other devices 106 in the device group 120, and so forth. For example, the hub device 122 may be the device that is physically closest to the access point 108 and thus experiences the lowest data transmission latency. In other implementations, the hub device 122 may comprise an edge compute resource that is located on the premises and may not have a microphone.

FIG. 1 depicts a block diagram of the audio device 106 that is acting as the hub device 122. Other devices 106 in the device group 120 may have the same, similar, or increased capabilities. As mentioned above, the operation as hub device 122 may change with time between different devices 106 in the device group 120.

The device 106 may include one or more hardware processor(s) 140 (processors) configured to execute one or more stored instructions. The processors 140 may include microcontrollers, systems on a chip (SoC), field programmable gate arrays, digital signals processors, graphic processing units, general processing units, and so forth. One or more clocks may provide information indicative of date, time, ticks, and so forth.

The device 106 may include memory 142 comprising one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 142 provides storage of computer-readable instructions, data structures, program modules, audio input data 150, and other data for the operation of the device 106. One or more of the modules shown here may be stored in the memory 142, although the same functionality may alternatively be implemented in hardware, firmware, or as a SoC. The modules may comprise instructions, that may be executed at least in part by the one or more processors 140.

The device 106 includes one or more communication interfaces 144 to communicate with other devices 106, one or more servers 102, or other devices 112. The communication interfaces 144 may include devices configured to couple to one or more networks. For example, the communication interfaces 144 may include devices compatible with Ethernet, WiFi, WiFi Direct, 3G, 4G, 5G, LTE, Bluetooth, Bluetooth Low Energy, ZigBee, Z-Wave, and so forth.

The device 106 may include one or more input devices including one or more microphones 146. In some implementations, the device 106 may include an array of microphones 146. The microphones 146 are used to acquire audio input data 150 that is representative of the input sound 130.

The audio input data 150 generated based on signals from the microphone(s) 146 of one device 106 may be sent to the hub device 122 for processing as described herein. In this illustration, the audio input data 150 comprises first audio input data 150(1) that is representative of sound acquired by the microphone 146 of the hub device 122 itself, while the second audio input data 150(2) is received from a second device 106 in the device group 120, and audio input data 150(N) is received from a $n^{th}$ device 106 in the device group 120.

The device 106 may include one or more output devices, such as a speaker 148, display device, light, actuator, and so forth. For example, the device 106 may use the speakers 148 to present audio output data 134 as output sound 136. In another example, the device 106 may include a display device to present visual output data, such as still images, video, and so forth.

A device management module 152 may provide various functions such as facilitating discovery of other devices 106 in a device group 120, maintaining device list data indicative of those members of the device group 120, determining pairwise set data 154, and so forth. The device management module 152 may also coordinate time synchronization between the devices 106 in the device group 120. For example, the hub device 122 may establish common timing among the devices 106 in the device group 120. This common timing may then be used to provide timing data associated with the audio input data 150. For example, portions of the audio input data 150 may be associated with time ticks of the common timing. In some implementations, the time synchronization may be coordinated to an external reference, such as a global positioning system (GPS) disciplined clock, network time protocol (NTP) server, and so forth.

The pairwise set data 154 provided by the device management module 152 is indicative of pairs of devices within the device group 120. Each pair may provide a unique combination. Order of the devices 106 within the pair is not significant with respect to the determination of a pair. For example, the pair "106(1), 106(2)" is equivalent to "106(2), 106(1)". The device management module 152 is discussed in more detail with regard to FIG. 2.

A sound location estimation module (SLEM) 160 accepts as input the audio input data 150 associated with the pairs indicated by the pairwise set data 154. For example, for the pair "106(1), 106(2)" the corresponding first audio input data 150(1) and second audio input data 150(2) are accepted as input. The SLEM 160 may provide as output estimated closest device data (ECDD) 162, an estimated location, or other information. The SLEM 160 may take into consideration one or more of energy in the audio input data 150, time difference of arrival of a signal present in both the first audio input data 150(1) and second audio input data 150(2), and so forth. Operation of the SLEM 160 is discussed in more detail in the following figures.

The ECDD 162 is indicative of the device 106 in the device group 120 that is deemed to be physically closest to the source of the input sound 130. In situations where the input sound 130 is produced by the user 128, the ECDD 162 is indicative of the device 106 that is deemed physically closest to the user 128.

An audio control module (ACM) 170 may use the ECDD 162 to determine one or more of which device 106 to use audio input from, which device 106 to present output from, and so forth. In one implementation, the ACM 170 may select the audio input data 150 produced by the closest device 106 as indicated by the ECDD 162. This selected audio input data 150 may be further processed to produce sent audio input data 172 that is then provided to another device, such as the server 102. Continuing the earlier example, the sent audio input data 172 may be transmitted to the server 102 supporting the telephone call of the user 128.

The processing performed by the ACM 170 may include application of one or more beamforming algorithms. For example, based on the ECDD 162 the ACM 170 may use beamforming techniques to process the selected audio input data 150, to increase the amplitude of the input sound 130 in the resulting sent audio input data 172.

The processing performed by the ACM 170 may include application of one or more automatic gain control (AGC) algorithms. For example, based on the ECDD 162 the ACM 170 may process the selected audio input data 150 to produce the resulting sent audio input data 172.

The processing performed by the ACM 170 may include application of one or more noise reduction (NR) algorithms. For example, based on the ECDD 162 the ACM 170 may process the selected audio input data 150 as a signal input, and audio input data 150 of other (farther) devices 106 as a noise input. The noise input may be subtracted from the signal input to produce the sent audio input data 172.

For clarity and not necessarily as a limitation, other elements of the device 106, such as power supplies, clocks, sensors, and so forth, are not shown.

Figure 2:
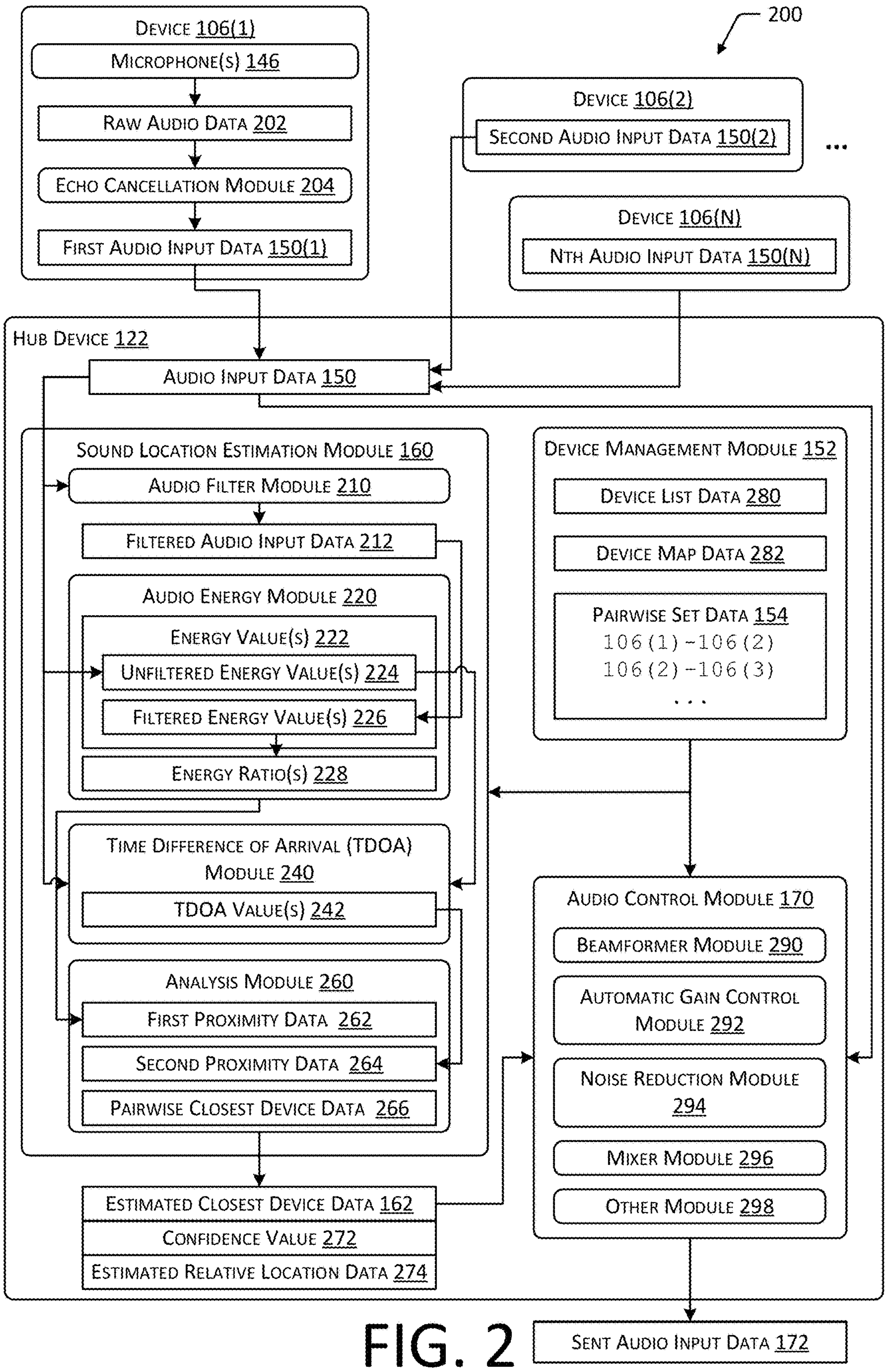
FIG. 2 is a block diagram of a system to determine an estimated closest device to the sound source, according to one implementation.

FIG. 2 is a block diagram 200 of a system to determine an estimated closest device to the sound source, according to one implementation. In this implementation, four devices are depicted, 106(1), 106(2), 106(N), and a hub device 122. The device group 120 includes devices 106(1)-(N), where "N" is a nonzero positive integer. One of the devices 106 in the device group 120 is designated as the hub device 122.

The devices 106(1)-(N) provide respective audio input data 150 to the hub device 122. For example, the first device 106(1) provides first audio input data 150(1), the second device 106(2) provides second audio input data 150(2), and so forth as the nth device 106(N) provides nth audio input data 150(N).

Each device 106 includes one or more microphones 146 that acquire raw audio data 202. For example, the raw audio data 202 may comprise digital output provided by an audio analog to digital converter (ADC). The raw audio data 202 may be processed to produce the audio input data 150. In one implementation, the device 106 may include an echo cancellation module 204 to implement an echo cancellation algorithm. In other implementations, other processing may be performed on the raw audio data 202 to produce the audio input data 150. For example, a residual echo suppression algorithm, a comfort noise generation algorithm, and so forth may also be used to process the raw audio data 202 to produce the audio input data 150. In another implementation, the raw audio data 202 may be provided to the hub device 122 as the audio input data 150. For example, the hub device 122 may then include an echo cancellation module to process the input audio data 150.

The audio input data 150 may thus comprise a plurality of separate sets or streams of audio input data 150 that is received from a plurality of devices 106. In some implementations, one of those devices providing audio input data 150 may be the hub device 122 itself. For example, the hub device 122 may include microphones 146 and may be used to acquire audio input data 150 as well.

The hub device 122 may include the device management module 152. The device management module 152 may maintain device list data 280. For example, the device management module 152 may receive data from other devices 106, the server 102, and so forth to determine the device list data 280. The device list data 280 is indicative of the devices 106 in the device group 120. The device list data 280 may include other information, such as resource availability of those devices 106, individual device type or capabilities, and so forth. In some implementations the device management module 152 may be used to facilitate a determination as to which device 106 will serve as the hub device 122.

The device management module 152 may determine device map data 282. The device map data 282 may be indicative of a relative or absolute arrangement of the devices 106 with respect to one another. This may be a logical or spatial relationship. For example, the device map data 282 may indicate that "device 106(1) is closest to device 106(2)" and "device 106(3) is closest to device 106(1)". In another example, the device map data 282 may indicate a distance in the physical space, physical coordinates with respect to a specified datum, and so forth. In yet another implementation, the device map data 282 may indicate a room. For example, the device map data 282 may indicate "device 106(1), kitchen; device 106(2), kitchen; device 106(3), dining room" and so forth.

The device management module 152 may determine device map data 282 based on user input, operation of one or more input device or output devices, and so forth. In one implementation, during setup, a first device 106(1) may use its speaker 148 to play a known sound at a specified volume. During playback, other devices 106 in the device group 120 may acquire audio input data 150. Based on information such as the relative energy in the signal, time differences of arrival, and so forth, the device map data 282 may be determined.

The device management module 152 may determine pairwise set data 154. The pairwise set data 154 may indicate the combinations of pairs of devices 106 present in the device group 120. During operation, the SLEM 160 may use the pairwise set data 154 to designate pairs being assessed.

The SLEM 160 receives the audio input data 150 from a plurality of devices 106. This audio input data 150 may be used without further modification, after filtering, or other processing.

An audio filter module 210 may apply one or more filters to the audio input data 150 to produce filtered audio input data 212. In one implementation the audio filter module 210 may implement a high pass filter with a corner frequency of 1500 Hz. As a result, the filtered audio input data 212 may represent signals having frequencies of at least 1500 Hz. For example, the audio filter module 210 may apply a filter with a passband of 1500 Hz to 20,000 Hz.

An audio energy module 220 determines one or more energy values 222 that are associated with the audio input data 150. In one implementation, the audio energy module 220 may determine energy values 222 that are based on sound pressure levels (SPL) of the signals represented by the audio input data 150.

The audio energy module 220 may determine unfiltered energy values 224 based on unfiltered audio input data 150. The audio energy module 220 may determine filtered energy values 226 based on the filtered audio input data 212.

The filtered energy values 226 may be used to determine energy ratios 228 for pairs of devices 106. For example, the energy ratio 228 may be calculated as the quotient of filtered energy value 226(1) associated with a first device 106(1) and filtered energy value 226(2) associated with a second device 106(2).

In implementations operating in the frequency domain, the filtered energy value 226 may be determined as the average energy of sub-bands from the corner frequency up to the Nyquist frequency. The low frequency sub-bands below the corner frequency are omitted from this determination.

As mentioned above, higher frequency sounds are typically more directional than low frequencies. By using the filtered energy values 226, the system 100 is able to take into consideration the relative orientation of the user 128 or other source of input sound 130 that is directional. For example, by filtering out sounds below the corner frequency, the filtered energy values 226 are more responsive to the orientation of the user 128 relative to the microphones 146. The use of filters also reduces or eliminates sound from noise sources, such as air handling equipment noise. This further improves overall accuracy of the system 100 during operation.

A time difference of arrival (TDOA) module 240 determines a TDOA value 242 for each pair of devices 106. The TDOA value 242 is indicative of a difference between the time of arrival of the input sound 130 at the first device 106(1) and the time of arrival of the input sound 130 at the second device 106(2). TDOA is illustrated with regard to FIG. 3. The TDOA module 240 may utilize the (unfiltered) audio input data 150 during operation.

In some implementations, operation of the TDOA module 240 may proceed when the unfiltered energy value 224 exceeds a threshold value. For example, the TDOA module 240 may disregard for consideration audio input data 150 that has an unfiltered energy value 224 less than the threshold value. This threshold may improve overall accuracy of the system 100 by avoiding dilution of the ECDD 162 from noise.

The TDOA value 242 may be determined by determining a correlation between pairs of audio input data 150 from different devices 106. In one implementation, a correlation value is determined between the first audio input data 150(1) and the second audio input data 150(2). This correlation value may be considered indicative of how similar these portions are to one another. For example, a correlation value of 1.0 may indicate the portions are indicative of the same signal, while a correlation value of 0.0 may indicate no similarity. Portions of the first and second audio input data 150 that are associated with correlation values greater than a threshold value are deemed to be sufficiently correlated may be deemed to be representative of the same input sound 130.

Once a correlated portion of the signal is determined, a difference in time of arrival between the two devices 106 may be determined by comparing the timing data associated with the audio input data 150. For example, each frame of audio input data 150 may be associated with a particular timestamp. By determining a relative displacement with regard to time of the same signal (as determined by the correlation) in the first and second audio input data 150, a TDOA value 242 may be calculated.

An analysis module 260 may accept as input one or more of the data available from the other modules described herein. In one implementation, the analysis module 260 may accept as input, for each pair, the energy ratio 228 and TDOA value 242.

The energy ratio 228 may be used to determine first proximity data 262. The first proximity data 262 may be indicative of a distance, arbitrary value, indicate one of the pair of devices 106, or other data. Based on the energy ratio 228, one of the devices 106 in the pair may be deemed to be closer than the other. For example, if the energy ratio 228 is calculated as first filtered energy value 226(1)/second filtered energy value 226(2), then if the energy ratio 228 is greater than 1.0, the first device 106 in the pair may be deemed to be closer to the source of the sound. If the energy ratio 228 is less than 1.0, the second device 106 in the pair is deemed closer.

In other implementations, other techniques may be used. For example, a normalized ratio may be calculated and used, a comparison of the energy values 222 may be performed, and so forth.

The TDOA value 242 may be used to determine second proximity data 264. The second proximity data 262 may be indicative of a distance, time, arbitrary value, indicate one of the pair of devices 106, or other data. Based on the mathematical sign of the TDOA value 242, a determination may be made as to which of the pair of devices 106 is closer to the sound source. For example, if the TDOA value 242 is calculated as first time of arrival minus second time of arrival, a negative sign on the difference is indicative of the first device in the pair being closer to the source of the sound. Likewise, a positive sign is indicative of the second device being closer to the source of the sound.

A relative distance between the devices 106 in the pair may be determined based on the TDOA value 242. For example, if the TDOA value 242 is −2.9 ms, that would indicate that the source of the sound is 1 meter closer to the first device 106 than the second device 106.

The analysis module 260 may determine the ECDD 162 based on one or more of the first proximity data 262 or the second proximity data 264 for one or more pairs. For each pair under consideration by the analysis module 260, in one implementation, if the first proximity data 262 and the second proximity data 264 agree with regard to which device 106 is closest to the sound source, pairwise closest device data (PCDD) 266 indicative of that device 106 is determined. If there is a disagreement, the second proximity data 264 alone may be used to determine the PCDD 266.

A confidence value 272 may be determined for the PCDD 266. Returning to the earlier implementation, if the first proximity data 262 and the second proximity data 264 agree, a relatively high confidence value 272 may be assigned to the resulting PCDD 266. If they disagree, the PCDD 266 may be associated with a relatively low confidence value 272.

The ECDD 162 is determined based on the PCDDs 266 of the one or more pairs being analyzed by the analysis module 260. For example, those pairs having a low confidence value 272 may be disregarded from consideration. Of the resulting high confidence values 272, the device 106 associated with the greatest count of PCDDs 266 may be designated as the ECDD 162. In the event no high confidence value 272 pairs are present, the greatest count of PCDDs 266 of the low confidence value 272 pairs may be selected as the ECDD 162. In other implementations other techniques may be used.

The analysis module 260 may provide as output one or more of the ECDD 162, the confidence value 272, or estimated relative location data 274. In some implementations, one or more of the energy ratios 228, the TDOA values

242, the first proximity data 262, or the second proximity data 264 may be used to determine an estimated relative location. The estimated relative location data 274 may indicate a distance, direction, coordinates with respect to a datum, and so forth. For example, the estimated relative location data 274 may be determined based on multilateration techniques using the TDOA values 242 from a plurality of pairs.

The ACM 170 accepts the output from the analysis module 260 and, based on that output, may perform one or more actions such as producing sent audio input data 172, selecting a device 106 for presentation of output, and so forth.

The ACM 170 may select and use the audio input data 150 from at least the device 106 indicated by the ECDD 162 for further processing, to send to the server 102, and so forth. The ACM 170 may include one or more of a beamformer module 290, an automatic gain control (AGC) module 292, a noise reduction (NR) module 294, a mixer module 296, or other module(s) 298.

One or more of the analysis module 260 or the audio control module 170 may implement a hysteresis function to minimize or eliminate rapid changes in audio input data 150 that is ultimately used to produce the sent audio input data 172. In one implementation the analysis module 260 may limit the determination of ECDD 162 to a specified time interval, such as every 10 ms.

In another implementation the audio control module 170 may receive a series of ECDD 162. For example, the series may indicate "... 106(1), 106(2), 106(2), 106(1), 106(1), 106(1), ... ". Once the same device 106 has been indicated by a threshold number of consecutive ECDD 162, the audio control module 170 may use the device 106 indicated by the threshold number of consecutive ECDD 162. Continuing the example, the audio input data 150 provided by device 106(1) may be used to determine the sent audio input data 172.

In yet another implementation the analysis module 260 may use a first set of thresholds at a first time and a second set of thresholds at a second time. For example, the first set of thresholds may specify a first threshold energy ratio used to determine the first proximity data 262 and a first threshold TDOA value, that is used to determine the second proximity data 264. Once a first ECDD 162 has been determined, the analysis module 260 may transition to using the second set of thresholds. The second set of thresholds may comprise a second threshold energy ratio that is greater than the first threshold energy ratio. The second set of thresholds may also comprise a second threshold TDOA value that is greater than the first threshold TDOA value.

The beamformer module 290 may implement one or more beamforming algorithms to provide directionality or gain based on input data from multiple microphones 146. The AGC module 292 may implement an AGC algorithm to maintain a specified signal amplitude.

The NR module 294 may apply one or more noise reduction techniques to reduce noise in the sent audio input data 172. In one implementation, the NR module 294 may utilize the audio input data 150 from the closest device 106 as indicated by the ECDD 162 as a signal input, while the audio input data 150 from one or more non-closest devices 106 are used as noise inputs. The noise inputs may be subtracted from the signal input to produce the sent audio input data 172. In other implementations other noise reduction techniques may be used.

The mixer module 296 may allow for selective combination of audio input data 150 from one or more devices 106. In one implementation the mixer module 296 may combine a plurality of audio input data 150 to produce the sent audio input data 172. The mixing may allow for selective combination of audio input data 150. In one implementation, the mixer module 296 may provide selective addition of first audio input data 150(1) and second audio input data 150(2) based on one or more audio mixing values. For example, a first audio mixing value of 0.8 may be assigned to the first audio input data 150(1) and a second audio mixing value of 0.2 may be assigned to the second audio input data 150(2). The mixer module 296 may multiply values representative of amplitude of a signal in the respective audio input data 150 by their respective audio mixing value, and the resulting products may be summed.

In other implementations the mixer module 296 may apply selective mixing for one or more frequency ranges. For example, audio input data 150 from a next-closest device 106 that is representative of signals over a threshold frequency may be summed to the audio input data 150 from the closest device 106.

The audio mixing values, or other parameters associated with the operation of the mixer module 296 may be based on one or more of unfiltered energy values 224, filtered energy values 226, energy ratios 228, TDOA values 242, and so forth. For example, the filtered energy values 226 may be used to determine the audio mixing values.

The techniques used by the SLEM 160 may be used to determine ECDD 162 with respect to sound sources that include, but are not limited to, sounds produced by users 128. For example, the SLEM 160 may be used to determine an ECDD 162 that is closest to a noise source.

The other modules 298 may provide other functions, such as determination of persistent noise sources, determination of which device 106 is closest to a persistent noise source, and so forth. For example, the SLEM 160 may acquire data over a time interval. If a sound source is deemed to be proximate to a particular device 106 for a length of time that exceeds a threshold value, the sound source may be deemed to be a noise source. For example, if a device 106 is located near a television that is turned on during the day and presenting audio output for hours, the device 106 may be deemed to be near a noise source.

In some implementations, the determination of a persistent noise source may be used by one or more of the SLEM 160, the audio control module 170, and so forth. For example, audio input data 150 from the device 106 deemed closest to a persistent noise source may be omitted from consideration by the SLEM 160. In another implementation, one or more thresholds associated with operation of the SLEM 160 or the audio control module 170 may be adjusted based on the persistent noise source. For example, the noise reduction module 294 may use audio input data 150 from the device 106 nearest the persistent noise source as a noise input.

Figure 3:
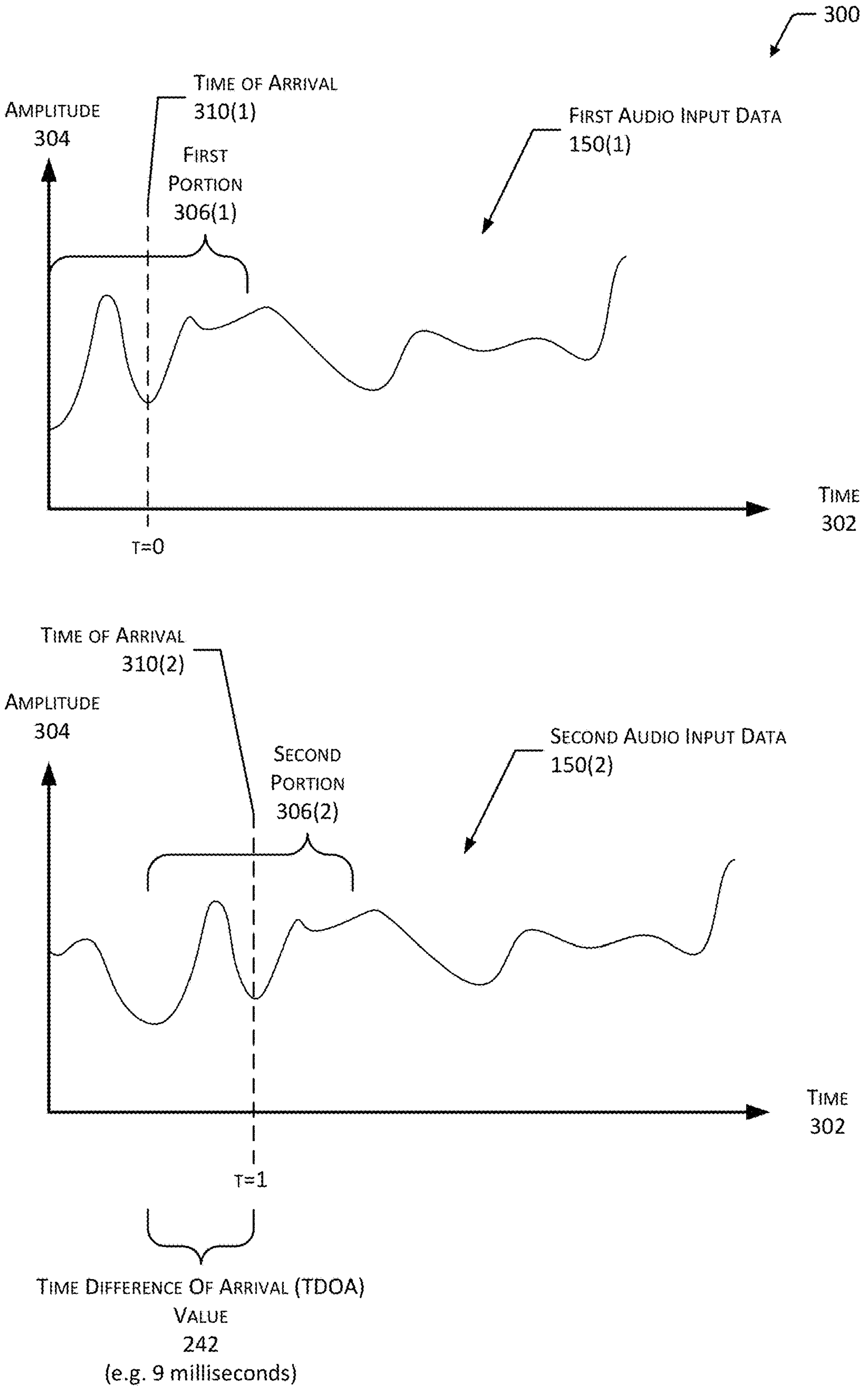
FIG. 3 illustrates a time difference of arrival (TDOA) between two signals acquired using microphones of respective devices, according to one implementation.

FIG. 3 illustrates at 300 a time difference of arrival (TDOA) between two signals acquired using microphones 146 of respective devices 106, according to one implementation. A first graph illustrates a first signal represented by the first audio input data 150(1). A second graph illustrates a second signal represented by the second audio input data 150(2). Each graph shows time 302 increasing left to right along a horizontal axis, while an amplitude 304 of the respective signal is shown as a vertical axis. In this illustration, the signals in the first graph and the second graph have been aligned to one another, with respect to time.

A first portion 306(1) of the first audio input data 150(1) is deemed to be representing the same signal as a second portion 306(2) of the second audio input data 150(2). For example, a correlation value of the first portion 306(1) with respect to the second portion 306(2) may exceed a threshold value.

A time of arrival 310 may be specified with regard to some part of the portion 306. For example, the time of arrival 310 may be specified to a temporal midpoint of a portion. In some implementations the portion 306 may comprise a frame of audio data.

A first time of arrival 310(1) associated with the first audio input data 150(1) is shown. A second time of arrival 310(2) associated with the second audio input data 150(2) is also shown. The TODA value 242 may be calculated as the difference between the first and second time of arrival 310.

It is understood that the techniques described in this disclosure may be applied in various signal domains, such as time domain, frequency domain, and so forth. In one implementation, the correlation to determine the portion 306 may be computed in the time domain. In another implementation the correlation may be computed in the frequency domain. For example, the correlation may be computed in the frequency domain by multiplying corresponding sub-bands. This technique is computationally efficient and reduces computation latency.

Figure 4:
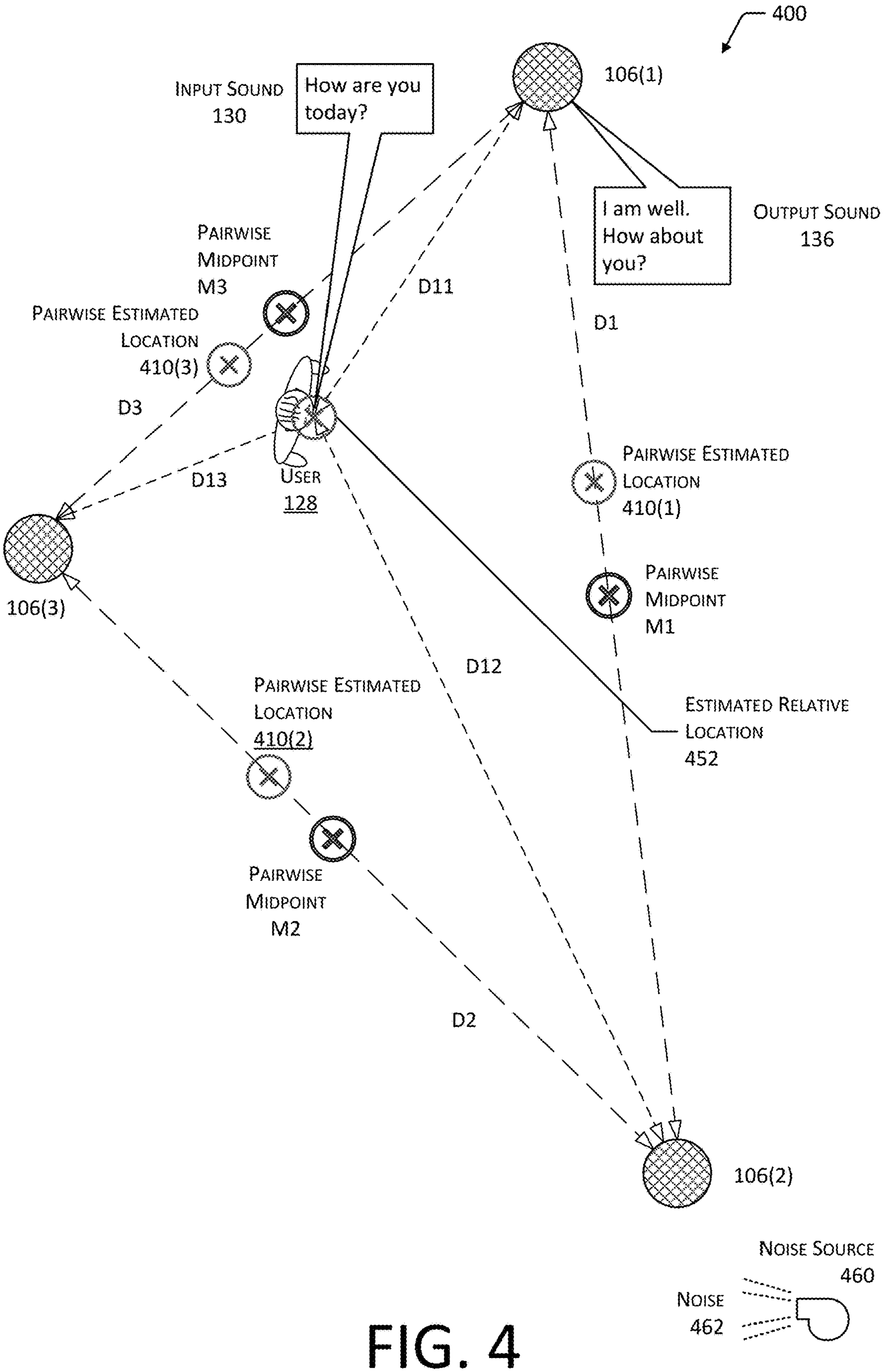
FIG. 4 illustrates three devices in a physical space and pairwise estimated locations, according to one implementation.

FIG. 4 illustrates a scenario 400 involving three devices 106 in a physical space and pairwise estimated locations, according to one implementation.

A device group 120 of three devices 106(1), 106(2), and 106(3) is shown. The pairs of these devices 106 are separated by distances D1, D2, and D3, respectively. Pairwise midpoints M1, M2, and M3 for each of those distances are shown for reference.

In this illustration, a user 128 is talking, providing input sound 130. The user 128 is located at a distance D11 from device 106(1), a distance D12 from device 106(2), and a distance D13 from device 106(3).

The SLEM 160 operates to determine the ECDD 162. In this illustration, the ECDD 162 designates the device 106(1) as being closest to the source of the input sound 130, that is the user 128. The data associated with this determination is shown with regard to FIG. 5.

In some implementations, the SLEM 160 may operate to determine respective pairwise estimated locations 410(1), 410(2), and 410(3). For example, the pairwise estimated locations 410 may be determined based on one or more of the energy ratio 228 or the TDOA value 242 for a respective pair. If the pairwise estimated location 410 is between a device 106 and a pairwise midpoint, that device 106 may be deemed to be closest to the input sound 130. For example, the pairwise estimated location 410(3) is between device 106(3) and the pairwise midpoint M3. As a result, device 106(3) may be deemed the closest device in the pair of devices 106(3)-106(1).

The physical space may also include one or more noise sources 460 that emit noise 462. In some implementations, the noise sources 460 may also be located using the SLEM 160. The ECDD 162 may be used to select signal and noise inputs for noise reduction processing. For example, the ECDD 162 indicates the device 106(1) is closest to the user 128. The audio input data 150 from the device 106(3) may be used as a signal input by the NR module 294. The audio input data 150 from the device 106(2) that is non-closest may be used as a noise input by the NR module 294.

FIG. 5 illustrates data 500 associated with FIG. 4, according to one implementation. The pairwise set data 154 illustrates the three pairs of devices 106 shown in FIG. 4. An energy ratio 228 for each pair is shown.

In this illustration, the energy ratio 228 is calculated by dividing the filtered energy value 226(1) based on audio input data 150(1) from the first device 106(1) (in the pair) by the filtered energy value 226(2) based on audio input data 150(2) from the second device 106(2) (in the pair). In this illustration, an energy ratio 228 value greater than a first threshold value of 1.0 indicates that more (filtered) energy is present at the first device 106 in the pair. In other implementations other threshold values may be used. A comparison of the energy ratio 228 to the first threshold value may thus be used to determine the first proximity data 262 indicative of which of the devices 106 in the pair is closest, with respect to detected energy.

Also shown are TDOA values 242 for each pair. Based on the mathematical sign of the TDOA value 242, a determination may be made as to which of the pair of devices 106 is closer to the sound source. For example, if the TDOA value 242 is less than zero, the first device 106 in the pair is closer to the source of the sound. Continuing the example, if the TDOA value 242 is greater than zero, the second device is closer to the source of the sound. Based on the TDOA value 242, second proximity data 264 is determined that is indicative of which of the devices 106 in the pair is closest, with respect to time of arrival of a signal.

A confidence value 272 may be associated with each pair. If the first proximity data 262 agrees with the second proximity data 264, the confidence value 272 may be deemed to be relatively high. If the two disagree, the confidence value 272 may be deemed to be relatively low.

In this illustration, the pair 106(3)-106(1) is associated with a low confidence value 272 due to disagreement between the first proximity data 262 and the second proximity data 264. The analysis module 260 may disregard this pair from further consideration.

The analysis module 260 may assess the remaining pairs having "high" confidence values 272 to determine the ECDD 162. One or more assessments may be used to determine which of the pairs, and the associated pairwise closest device, should be designated in the ECDD 162. In one implementation, the pair having the greatest energy ratio 228 may be selected. In another implementation, the pair having the lowest TDOA value 242 may be selected. In yet another implementation, the energy ratio 228 and the TDOA value 242 may be considered to determine the ECDD 162.

In this illustration, the device 106(1) is associated with the greatest energy ratio 228 and the shortest TDOA value 242. Based on these factors, the ECDD 162 indicates that the device 106(1) is the closest device. Note that because the energy values 222 are taken into consideration and given the directionality of some sounds such as speech from the user 128, the device 106 indicated by the ECDD 162 may not be the device 106 that is geometrically closest in the physical space to the user 128, such as shown here where D11 is greater than D13. In another example, not shown, if the user 128 had turned towards the third device 106(3), a corresponding increase in energy value 222 associated with that device 106(3) would result in the determination changing so that the ECDD 162 indicates the device 106(3).

In some implementations, one or more sorts may be used to determine the ECDD 162. For example, the data 500 may be sorted greatest to lowest by confidence value 272, greatest to lowest by absolute value of TDOA value 242, then greatest to lowest by absolute value of energy ratio 228. From this sorted list, the first pair may be indicated in the ECDD 162. In other implementations, other sorts may be used.

Figure 6:
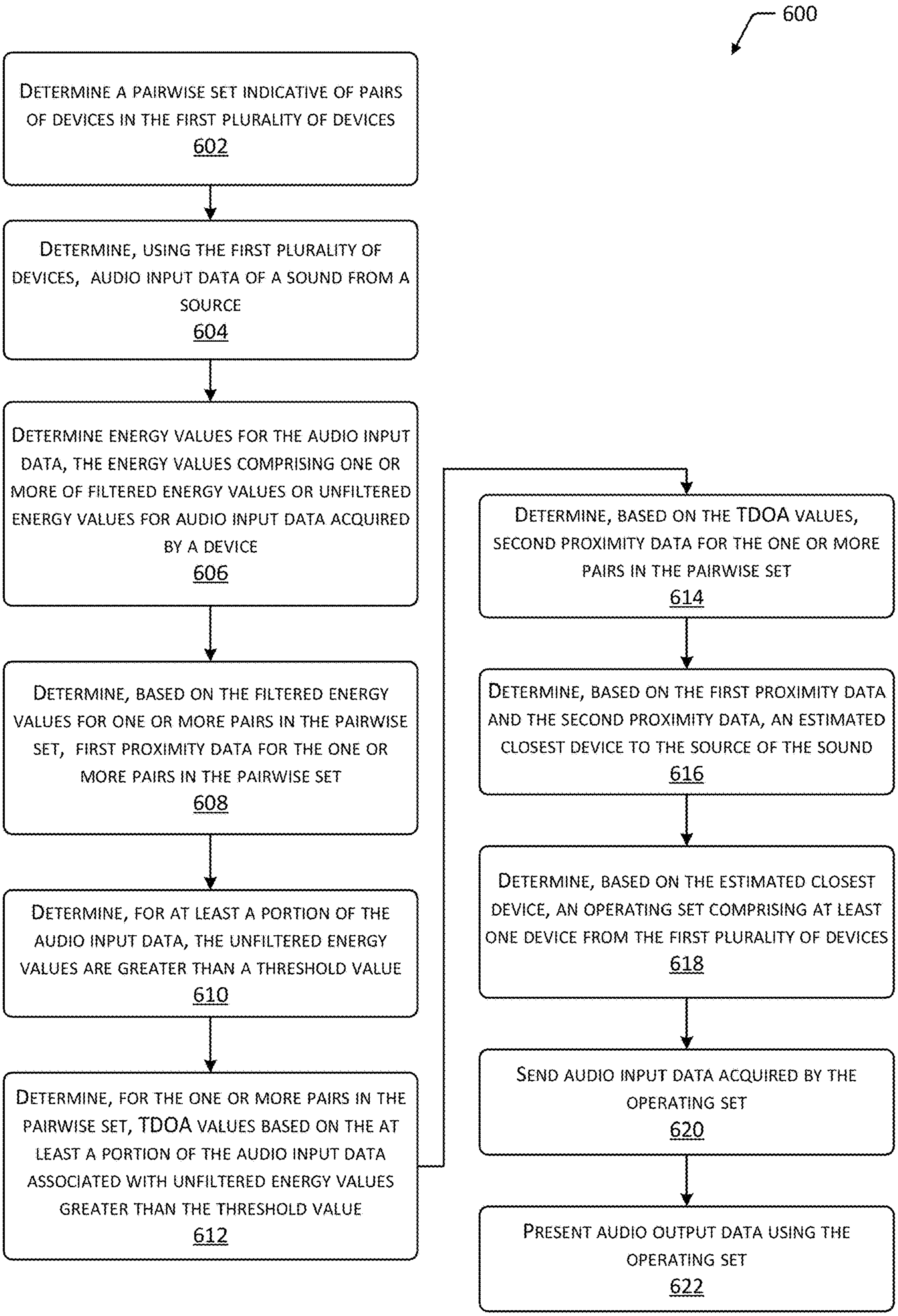
FIG. 6 is a flow diagram of a process to determine a device closest to a sound source, according to one implementation.

FIG. 6 is a flow diagram 600 of a process to determine a device 106 closest to a sound source, according to one implementation. The process may be implemented by one or more of the devices 106, the server 102, and so forth.

At 602 a pairwise set is determined that is indicative of pairs of devices in a first plurality of devices 106. For example, pairwise set data 154 may be determined by the device management module 152 for pairs of devices in the device group 120.

At 604 audio input data 150 is determined using the first plurality of devices 106. For example, first audio input data 150(1) is determined by the first device 106(1), second audio input data 150(2) is determined by the second device 106(2), and so forth. The audio input data 150 may be representative of sound from a source, such as input sound 130 produced by the user 128.

At 606 energy values 222 are determined for the audio input data 150. For example, the audio energy module 220 may determine the unfiltered energy values 224 and the filtered energy values 226.

At 608, based on the filtered energy values 224, the first proximity data 262 is determined for one or more pairs in the pairwise set. For example, the analysis module 260 may determine the first proximity data 262.

At 610, at least a portion of the audio input data 150 is determined to have unfiltered energy values 224 greater than a threshold value.

At 612, TDOA values 242 are determined for one or more of the pairs in the pairwise set. In one implementation, the TDOA module 240 may assess the unfiltered energy values 224 and proceed to process the audio input data 150 that has unfiltered energy values 224 greater than the threshold value to determine the TDOA values 242. Audio input data 150 associated with unfiltered energy values 224 less than the threshold value may be disregarded.

At 614, based on the TDOA values 242, second proximity data 264 is determined for the one or more pairs in the pairwise set. For example, the analysis module 260 may determine second proximity data 264 for each pair that has a TDOA value 242.

At 616, based on the first proximity data 262 and the second proximity data 264, the ECDD 162 is determined. For example, the analysis module 260 may determine the ECDD 162 based on the PCDDs 266 associated with the pairwise set.

In one implementation the analysis module 260 may use respective confidence values 272 associated with the pairs of devices in the pairwise set. The determination of the ECDD 162 may be based on the confidence values 272. For example, pairs associated with confidence values 272 less than a threshold value may be disregarded from consideration. Continuing the example, a pair with a greatest confidence value 272 may be used to determine the ECDD 162.

At 618, based on the ECDD 162, an operating set is determined that comprises at least one device 106 from the first plurality of devices. For example, the closest device 106 indicated by the ECDD 162 may be included in the operating set. In some implementations, the ECDD 162 may indicate a plurality of closest devices. For example, the ECDD 162 may indicate a pair of closest devices to provide for stereophonic audio input and audio output. One or more actions may be taken using the operating set.

At 620 audio input data 150 determined by the one or more devices 106 in the operating set are sent. For example, the ACM 170 may send the sent audio input data 172 to the server 102. In another example, audio input data 150 determined by the devices 106 in the operating set may be provided as input to the mixer module 296 that selectively combines or otherwise processes those inputs to produce the sent audio input data 172.

At 622 audio output data 134 is presented using the one or more devices 106 in the operating set. For example, the audio output data 134 from the server 102 may be presented using the speakers 148 of one or more devices 106 in the operating set.

In some implementations, different operating sets may be specified for input and output. For example, a first operating set associated with acquiring audio input may comprise one device 106(1), while a second operating set associated with presenting audio output may comprise devices 106(2) and 106(3).

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

a first device comprising:
- a first communication interface;
- a first microphone;
- a first memory storing first computer-executable instructions; and
- a first hardware processor to execute the first computer-executable instructions to:

determine first audio data representative of speech input, wherein the speech input is associated with a user;

receive, from a second device, second audio data representative of the speech input;

determine a correspondence between a first portion of the first audio data and a second portion of the second audio data;

determine a first energy value indicative of acoustic energy represented by the first portion;

determine a second energy value indicative of acoustic energy represented by the second portion;

determine that the second energy value is greater than the first energy value;

determine, based on the correspondence, a time difference of arrival (TDOA) value that is indicative of a difference in time at which the speech input is detected at the first and the second devices;

determine, based on the TDOA value, that the user is closer to the second device than the first device;

determine a noise source based on one or more of:

the first audio data, the second audio data, the first energy value, the second energy value, or the TDOA value;

determine that the first device is closest to the noise source;

determine, based on the second audio data, third audio data; and send, using the first communication interface, the third audio data to a third device.

2. The system of claim 1, wherein the first portion of the first audio data and the second portion of the second audio data are associated with a frequency range of at least 1500 Hz.

3. The system of claim 1, the system further comprising:

the second device comprising:

a speaker;

a second communication interface;

a second microphone;

a second memory storing second computer-executable instructions; and a second hardware processor to execute the second computer-executable instructions to:

receive an instruction to present audio output; and present the audio output using the speaker.

4. The system of claim 1, wherein the first audio data and the second audio data are processed using an echo cancellation algorithm.

5. The system of claim 1, the first computer-executable instructions to determine the third audio data comprising instructions to:

process the second audio data using one or more of:

an automatic gain control algorithm, or a beamforming algorithm.

6. The system of claim 1, the first computer-executable instructions to determine the third audio data comprising instructions to:

process the second audio data with a noise reduction algorithm, wherein the second audio data is a signal input and the first audio data is used as a noise input to the noise reduction algorithm.

7. The system of claim 1, wherein:

the third audio data does not include the first audio data.

8. A method comprising:

determining first audio input data by a first device, wherein the first audio input data is representative of a first sound;

determining second audio input data by a second device, wherein the second audio input data is representative of the first sound;

determining a first energy value indicative of acoustic energy represented by the first audio input data;

determining a second energy value indicative of acoustic energy represented by the second audio input data;

determining, based on the first energy value being greater than the second energy value, first proximity data that indicates a source of the first sound is closer to the first device than the second device;

determining, based on the first audio input data and the second audio input data, a time difference of arrival (TDOA) value of the first sound;

determining, based on the TDOA value, second proximity data that indicates the source of the first sound is closer to the first device than the second device;

determining a noise source based on one or more of:

the first audio input data, the second audio input data, the first energy value, the second energy value, or the TDOA value;

determining the second device is closest to the noise source; and based on the first proximity data and the second proximity data, sending, by the first device, third audio input data to a third device.

9. The method of claim 8, further comprising:

based on the first proximity data and the second proximity data, presenting audio output data using the first device.

10. The method of claim 8, further comprising:

determining an estimated location in a physical space, relative to the first device and the second device;

determining a fourth device that is closest to the estimated location, wherein the fourth device comprises a speaker; and presenting audio output data using the fourth device.

11. The method of claim 8, wherein the second proximity data is determined based on the TDOA value indicating the first sound arrived at the first device before the first sound arrived at the second device.

12. The method of claim 8, wherein the determining the TDOA value is responsive to:

the first energy value being greater than a threshold value; and the second energy value being greater than the threshold value.

13. The method of claim 8, further comprising:

determining fourth audio input data by the second device; and processing the third audio input data using one or more noise reduction algorithms, wherein the fourth audio input data is deemed representative of noise and the first audio input data is deemed representative of a signal.

14. The method of claim 8, wherein:

the third audio input data does not include audio input data determined by the second device.

15. A method comprising:

determining, using a first device, first audio input data representative of a sound;

determining, based on the first audio input data, a first energy value;

determining, using a second device, second audio input data representative of the sound;

determining, based on the second audio input data, a second energy value;

determining first proximity data, based on the first energy value and the second energy value, the first proximity data indicative of proximity of the first device to a source of the sound;

determining, based on the first audio input data and the second audio input data, a time difference of arrival (TDOA) value;

determining second proximity data based on the TDOA value, the second proximity data indicative of proximity of the second device to the source of the sound;

determining, based on the first proximity data and the second proximity data, that the first device is closest to the source of the sound;

determining a noise source based on one or more of:

the first audio input data, the second audio input data, the first energy value, the second energy value, or the TDOA value;

determining that the second device is closest to the noise source; and sending, by the first device, third audio input data to a third device.

16. The method of claim 15, the determining the TDOA value comprising:

determining, based on the first audio input data, a first time of arrival of the sound at the first device;

determining, based on the second audio input data, a second time of arrival of the sound at the second device; and determining a difference between the first time of arrival and the second time of arrival.

17. The method of claim 15, further comprising:

applying a high pass filter to the first audio input data to determine first filtered audio input data;

wherein the first energy value is based on the first filtered audio input data; and applying the high pass filter to the second audio input data to determine second filtered audio input data;

wherein the second energy value is based on the second filtered audio input data.

18. The method of claim 15, further comprising:

determining that the first energy value is greater than a threshold value; and determining that the second energy value is greater than the threshold value.

19. The method of claim 15, further comprising:

presenting audio output data using a first speaker of the first device.

20. The method of claim 15, wherein the third audio input data does not include the first audio input data.

* * * * *